(12) United States Patent
Takeda et al.

(10) Patent No.: US 10,780,600 B2
(45) Date of Patent: Sep. 22, 2020

(54) METHOD FOR CUTTING GATE FORMED ON MOLDED ARTICLE

(71) Applicant: FANUC CORPORATION, Yamanashi (JP)

(72) Inventors: Nobuto Takeda, Yamanashi (JP); Hiroshi Oowatari, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/725,503

(22) Filed: Oct. 5, 2017

(65) Prior Publication Data

US 2018/0099429 A1    Apr. 12, 2018

(30) Foreign Application Priority Data

Oct. 7, 2016 (JP) ................. 2016-199384

(51) Int. Cl.
*B26D 5/00* (2006.01)
*B22D 31/00* (2006.01)
*B25J 11/00* (2006.01)
*B26D 1/58* (2006.01)

(52) U.S. Cl.
CPC ............ *B26D 5/007* (2013.01); *B22D 31/00* (2013.01); *B25J 11/0055* (2013.01); *B26D 1/58* (2013.01)

(58) Field of Classification Search
CPC ... Y10T 83/533; Y10T 83/538; Y10T 83/525; B22D 31/00; B26D 5/007; B26D 1/58; B25J 11/0055
See application file for complete search history.

(56) References Cited

U.S. PATENT DOCUMENTS

| 4,017,723 | A | * | 4/1977 | Fickes | G05B 19/184 318/570 |
| 4,344,219 | A | * | 8/1982 | Tanabe | H05K 13/0038 140/105 |
| 4,875,254 | A | * | 10/1989 | Rudy | A22C 17/002 452/157 |
| 5,089,971 | A | * | 2/1992 | Gerber | B26D 5/00 700/134 |
| 5,387,852 | A | * | 2/1995 | Maida | G05B 19/4097 318/567 |

(Continued)

FOREIGN PATENT DOCUMENTS

| CN | 103091735 A | 5/2013 |
| JP | 04090319 A | 3/1992 |

(Continued)

*Primary Examiner* — Kenneth E Peterson
*Assistant Examiner* — Fernando A Ayala
(74) *Attorney, Agent, or Firm* — RatnerPrestia (57) ABSTRACT

A method for automatically cutting off a material passage part while reducing manufacturing cost and cycle time. This method includes preparing a cutting device capable of moving in an automatic control coordinate system, placing the molded article without fixing the molded article, detecting a shape of the molded article by a sensor, acquiring a position of the material passage part in the coordinate system, determining a position of a cut spot in the material passage part as a target position in the coordinate system, moving the cutting device in the coordinate system and disposing the cutting device on a work position for cutting the cut spot, and cutting the cut spot by the cutting device arranged on the work position.

7 Claims, 7 Drawing Sheets

(56) References Cited

U.S. PATENT DOCUMENTS

| | | | | |
|---|---|---|---|---|
| 5,512,808 A | * | 4/1996 | Clark, Jr. | G05B 19/251 |
| | | | | 257/E21.238 |
| 6,205,370 B1 | * | 3/2001 | Blaimschein | B26D 5/00 |
| | | | | 700/134 |
| 8,113,098 B1 | * | 2/2012 | Longfellow | B27B 5/34 |
| | | | | 83/364 |
| 2003/0145699 A1 | * | 8/2003 | Kim | B26D 3/10 |
| | | | | 83/13 |
| 2006/0156878 A1 | * | 7/2006 | Faires | A22C 7/00 |
| | | | | 83/13 |
| 2011/0208256 A1 | * | 8/2011 | Zuhars | A61F 2/30756 |
| | | | | 606/86 R |
| 2011/0290090 A1 | * | 12/2011 | Urabe | B25J 9/1682 |
| | | | | 83/23 |
| 2013/0107373 A1 | * | 5/2013 | Takumi | B29C 45/382 |
| | | | | 359/642 |
| 2017/0297352 A1 | * | 10/2017 | Porat | B41J 11/663 |

FOREIGN PATENT DOCUMENTS

| | | |
|---|---|---|
| JP | 0483620 U | 7/1992 |
| JP | H05-016195 U | 3/1993 |
| JP | H05-057686 A | 3/1993 |
| JP | 05116191 A | 5/1993 |

* cited by examiner

METHOD FOR CUTTING GATE FORMED ON MOLDED ARTICLE

BACKGROUND OF THE INVENTION

1. Field of the Invention

The invention relates to a method for cutting a gate formed on a molded article.

2. Description of the Related Art

A method for cutting a gate, which is formed on a molded article, by a robot having a cutting device is known (e.g., JP-A5-57686 and JP-UM-A-5-16195). In the related art, a jig for clamping a molded article in cutting of a gate needs to be prepared for every type of molded article. This results in an increase in manufacturing cost and cycle time.

SUMMARY OF THE INVENTION

In an aspect of the invention, a method of automatically cutting off a material passage part from a molded article including a product part and the material passage part, includes providing a cutting device movable in an automatic control coordinate system; placing the molded article without fixing it; and detecting a shape of the placed molded article by a sensor.

The method includes acquiring a position of the material passage part in the coordinate system, based on the detected shape of the molded article; and determining a position of a cut spot in the material passage part as a target position in the coordinate system, based on the acquired position of the material passage part.

The method includes moving the cutting device in the coordinate system based on the determined target position, so as to arrange the cutting device at a work position for cutting the cut spot; and cutting the cut spot by the cutting device arranged at the work position.

The method may further include further detecting a shape of the molded article by the sensor after cutting the cut spot; further acquiring a position of the material passage part in the coordinate system based on the shape of the molded article detected after cutting the cut spot; and determining a position of a second cut spot in the material passage part as a second target position in the coordinate system, based on the position of the material passage part acquired after cutting the cut spot.

The method may further include moving the cutting device in the coordinate system based on the determined second target position, so as to arrange the cutting device at a second work position for cutting the second cut spot; and cutting the second cut spot by the cutting device arranged at the second work position.

A shape of a placed first molded article may be detected by a first sensor, and a shape of a placed second molded article may be detected by a second sensor. The cutting device may be attached to a manipulator by which the cutting device is moved in the coordinate system.

The method may further include gripping the material passage part by a robot hand attached to the manipulator, after cutting the cut spot; and operating the manipulator so as to convey the material passage part gripped by the robot hand to a predetermined site.

The method may further include gripping the product part by the robot hand attached to the manipulator, after cutting the cut spot; and operating the manipulator so as to convey the product part gripped by the robot hand to a predetermined site.

In another aspect of the invention, a cutting system for automatically cutting off a material passage part from a molded article including a product part and the material passage part, includes a cutting device movable in an automatic control coordinate system; a manipulator configured to move the cutting device in the coordinate system; and a sensor configured to detect a shape of the molded article.

The cutting system includes an acquisition section configured to acquire a position of the material passage part in the coordinate system from the shape of the molded article detected by the sensor; and a determination section configured to determine a position of a cut spot in the material passage part as a target position in the coordinate system, based on the position of the material passage part acquired by the acquisition section.

The cutting system includes a manipulator controller configured to operate the manipulator based on the target position determined by the determination section, so as to move the cutting device in the coordinate system to arrange the cutting device at a work position for cutting the cut spot; and a cut controller configured to operate the cutting device so as to cut the cut spot.

BRIEF DESCRIPTION OF THE DRAWINGS

The above-described or other objects, features and advantages of the invention will become more apparent from the following description of the embodiments with reference to the accompanying drawings, in which.

DETAILED DESCRIPTION

Embodiments of the invention will be detailed below based on the accompanying drawings. Note that, in various embodiments described below, similar components will be assigned the same reference numeral, and duplicate description thereof will be omitted. Further, in the following description, the orthogonal coordinate system in the drawings is used as standard for directions, and for the sake of convenience, the x-axis plus direction is referred to as the leftward direction, the y-axis plus direction is referred to as the frontward direction, and the z-axis plus direction is referred to as the upward direction.

Figure 1:
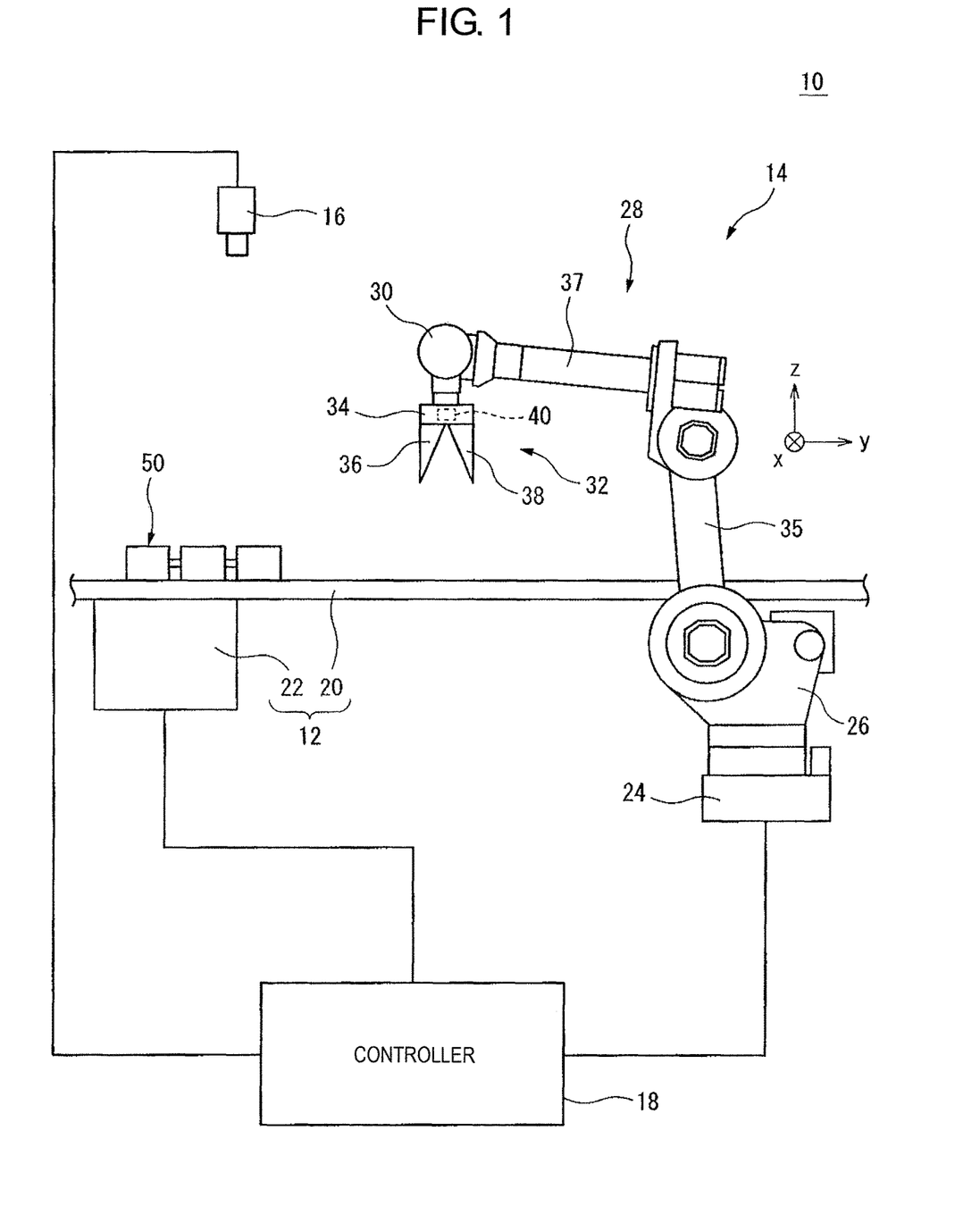
FIG. 1 is a drawing of a cutting system according to an embodiment.

A cutting system 10 according to an embodiment of the invention will be described with reference to FIG. 1. The cutting system 10 includes a conveyor 12, a robot 14, a vision sensor 16, and a controller 18.

The conveyor 12 is a roller conveyor, a belt conveyor or the like, and conveys a molded article 50 frontward. Specifically, the conveyor 12 includes a movable section 20 on which the molded article 50 is placed, and a drive section 22 configured to generate power for moving the movable section 20.

The drive section 22 includes e.g. a servo motor, and moves the movable section 20 in accordance with a command from the controller 18, thereby conveys the molded article 50 placed on the movable section 20 frontward.

The robot 14 is a vertical articulated robot, and includes a robot base 24, a rotary barrel 26, a robot arm 28, a wrist 30, and a cutting device 32. The robot base 24 is fixed on a floor of a work cell. The rotary barrel 26 is provided at the robot base 24 so as to be rotatable about a vertical axis.

The robot arm 28 includes an upper arm 35 rotatably coupled to the rotary barrel 26, and a forearm 37 rotatably coupled to a distal end of the upper arm 35. The wrist 30 is attached to a distal end of the forearm 37, and supports the cutting device 32 so as to be rotatable about three axes.

The cutting device 32 includes a base 34, a pair of blades 36 and 38, and a blade drive section 40. The base 34 is coupled to the wrist 30. The blades 36 and 38 are attached at the base 34 so as to open and close. The blade drive section 40 includes e.g. a servo motor or a cylinder, and opens and closes the blades 36 and 38 in accordance with a command from the controller 18.

The vision sensor 16 is fixed upward of the movable section 20 of the conveyor 12. The vision sensor 16 is e.g. a three-dimensional vision sensor, and includes an image sensor, an optical lens, an image processor, and a storage, etc.

The vision sensor 16 detects a shape of the molded article 50 placed on the movable section 20 of the conveyor 12, in accordance with a command from the controller 18. Specifically, the vision sensor 16 images the molded article 50 placed on the movable section 20, detects characteristic points of the molded article 50 based on the captured image data, and detects positions of these characteristic points in a sensor coordinate system.

The sensor coordinate system is one of automatic control coordinate systems, and is a three-dimensional coordinate system which is defined with respect to a visual line of the vision sensor 16.

The controller 18 includes e.g. a CPU and storage, and directly or indirectly controls each component of the cutting system 10. Specifically, the controller 18 sends a command to the drive section 22 of the conveyor 12 so as to move the movable section 20.

Further, the controller 18 sends a command to the blade drive section 40 of the cutting device 32 so as to open and close the blades 36 and 38. Further, the controller 18 sends a command to the vision sensor 16 so as to image the molded article 50 placed on the movable section 20 of the conveyor 12 by the vision sensor 16.

Further, the controller 18 sends a command to each of the servo motors (not illustrated) built in the rotary barrel 26, the robot arm 28, and the wrist 30 of the robot 14, so as to operate these movable elements.

The controller 18 operates the rotary barrel 26, the robot arm 28, and the wrist 30 to arrange the cutting device 32 at an arbitrary position and orientation in a robot coordinate system. The robot coordinate system is one of automatic control coordinate systems, and may be defined as the orthogonal coordinate system illustrated in FIG. 1 and FIG. 2, for example.

The controller 18 generates commands for the servo motors (not illustrated) respectively built in the rotary barrel 26, the robot arm 28, and the wrist 30 in order to move the cutting device 32 in the robot coordinate system.

Thus, in this embodiment, the rotary barrel 26, the robot arm 28, and the wrist 30 constitute a manipulator which moves the cutting device 32.

Next, with reference to FIG. 2, the molded article 50 will be described. In this embodiment, each molded article 50 includes a material passage part 54 and a total of four product parts 52 arranged around the material passage part 54.

When the molded article 50 is molded, a material (e.g., resin) of the molded article 50 passes through a sprue, a runner, and a gate of a mold (not illustrated), and is filled into mold parts corresponding to the respective product parts 52. The material passage part 54 is a part formed by the material of the molded article 50 remaining in the sprue, the runner, and the gate of the mold when the molded article 50 is molded.

The material passage part 54 includes a piece of sprue part 58, a total of four runner parts 56 extending from the sprue part 58 toward the respective product parts 52, and gate parts 60 respectively formed at distal ends of the runner parts 56 and connected to the product parts 52.

The sprue part 58 is a substantially circular columnar element. Each of the runner parts 56 is an elongated rod-shaped element. Each of the gate parts 60 is an element having a cross-sectional area slightly smaller than that of the runner part 56. The cutting system 10 according to this embodiment cuts each of the runner parts 56 at a predetermined position, and thereby, automatically cuts off the material passage part 54 from each of the product parts 52.

Figure 3:
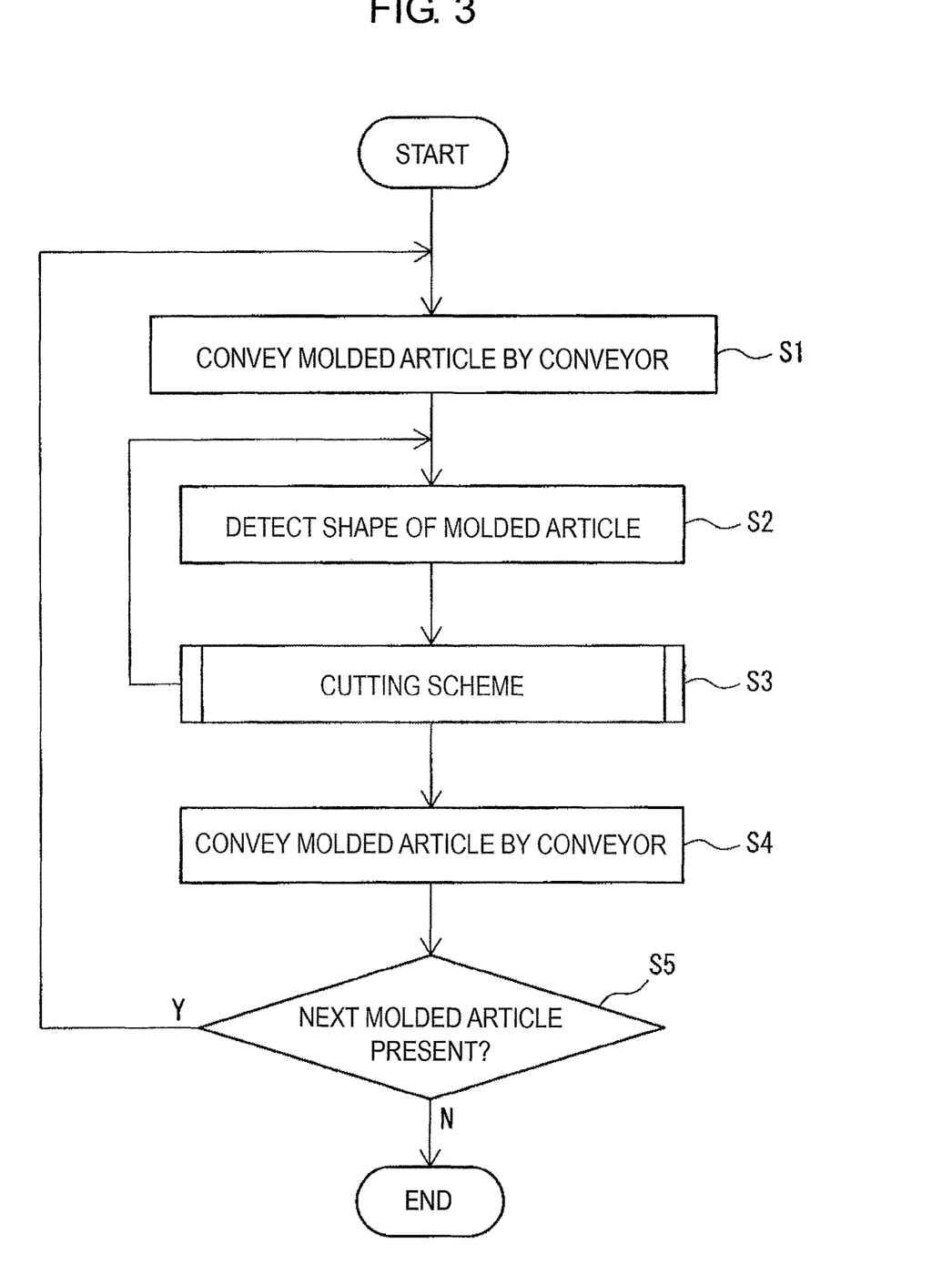
FIG. 3 is a flowchart illustrating an example of an operation flow of the cutting system illustrated in FIG. 1.

Next, with reference to FIG. 3, an operation of the cutting system 10 will be described. A flow illustrated in FIG. 3 is started when the controller 18 detects that the molded article 50 is placed on the upstream end of the movable section 20 of the conveyor 12.

For example, the cutting system 10 may further include a placement sensor (not illustrated) capable of detecting that the molded article 50 is placed on the upstream end of the movable section 20. This placement sensor may include a vision sensor, a displacement sensor or the like, and detects that the molded article 50 is placed on the upstream end of the movable section 20, in a non-contact state.

When the placement sensor detects that the molded article 50 is placed on the upstream end of the movable section 20, the placement sensor sends a placement detection signal to the controller 18. When the controller 18 receives the first placement detection signal from the placement sensor, the controller 18 starts the flow illustrated in FIG. 3.

In this embodiment, the molded article 50 is placed on the upstream end of the movable section 20 by a user or a placement robot different from the robot 14, without being fixed by a jig or the like.

At step S1, the controller 18 operates the conveyor 12 so as to convey the molded article 50 placed on the movable section 20. Specifically, the controller 18 sends a command to the drive section 22 of the conveyor 12 so as to convey the molded article 50 placed on the upstream end of the movable section 20 to a predetermined detection position located downward of the vision sensor 16.

When the molded article 50 is arranged at the detection position, the vision sensor 16 can image the whole of the molded article 50. When the molded article 50 is arranged at the detection position, the controller 18 stops the conveyor 12.

At step S2, the controller 18 operates the vision sensor 16 so as to detect a shape of the molded article 50. Specifically, the controller 18 sends a detection command to the vision sensor 16. When the vision sensor 16 receives the detection command from the controller 18, the vision sensor 16 images the molded article 50 placed on the movable section 20 of the conveyor 12.

Figure 2:
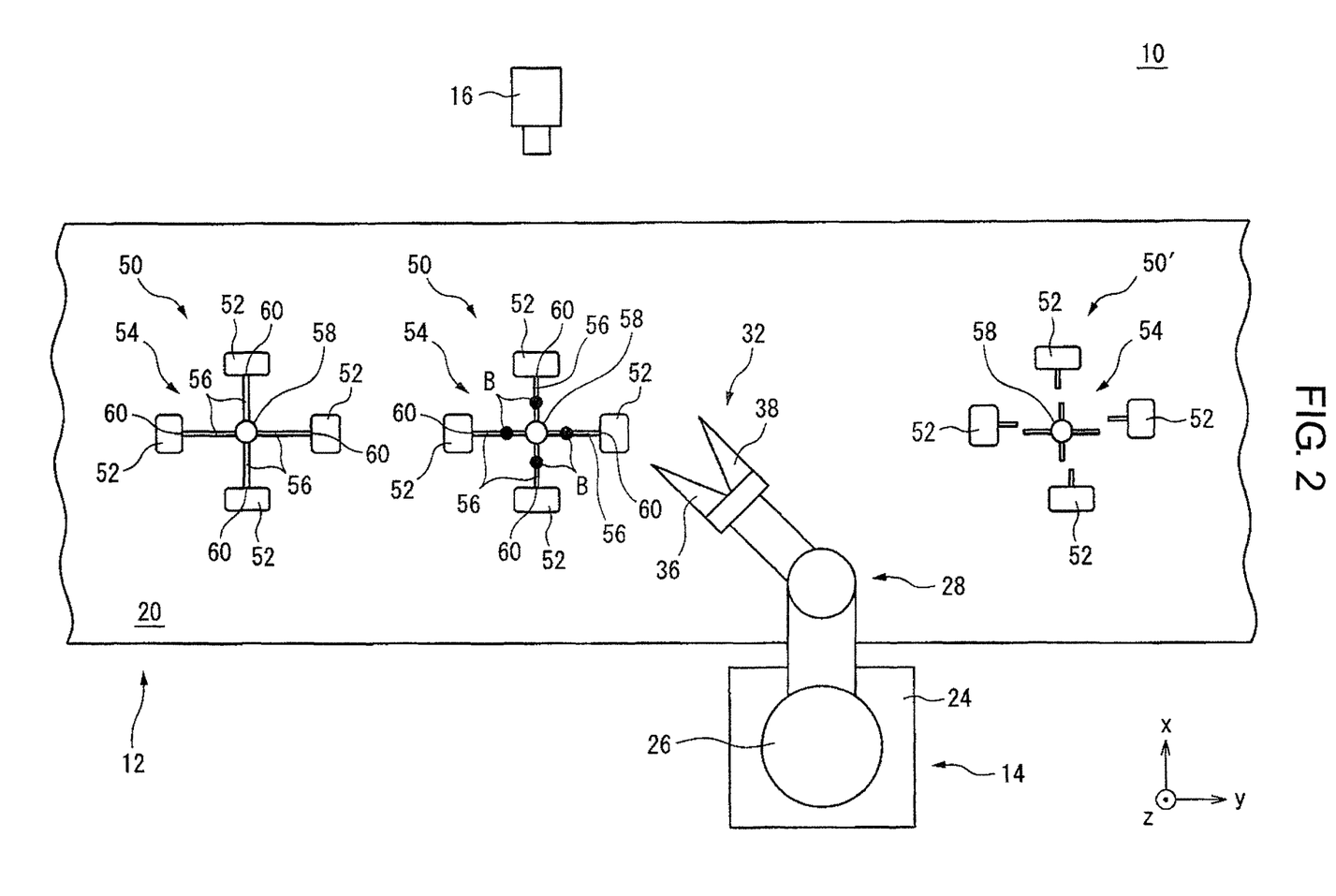
FIG. 2 is a drawing viewing the cutting system illustrated in FIG. 1 from a vertical upper side.

In this embodiment, the vision sensor 16 acquires an image of the molded article 50 viewed from vertically upward, as shown in FIG. 2. The vision sensor 16 detects characteristic points of the molded article 50 in the sensor coordinate system from the acquired image of the molded article 50. The vision sensor 16 sends the detected image and information of the characteristic points of the molded article 50 to the controller 18.

At step S3, the controller 18 carries out a cutting scheme. This step S3 will be described with reference to FIG. 4.

Figure 4:
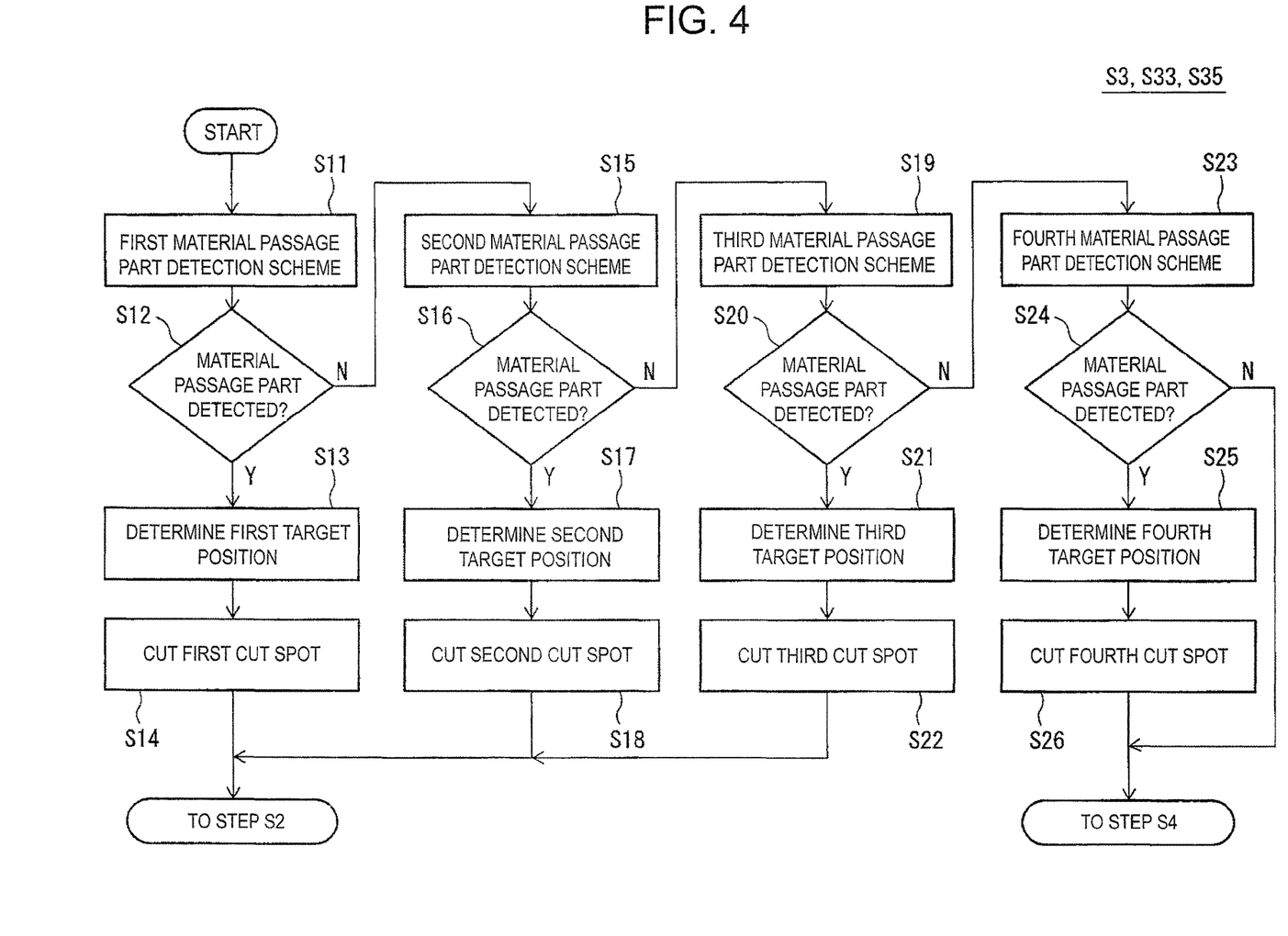
FIG. 4 is a flowchart illustrating an example of a flow of step S3 in FIG. 3, and S33 and S35 in FIG. 6.

At step S11, the controller 18 carries out a first material passage part detection scheme. Specifically, the controller 18 compares the image of the molded article 50, which has been acquired from the vision sensor 16 at most-recently executed step S2, with a reference image of the molded article 50 (e.g., in the form of a two-dimensional model in an x-y plane) pre-stored in the storage of the controller 18, and detects the position of the sprue part 58 in the sensor coordinate system in the image data of the molded article 50.

Thus, in this embodiment, the controller 18 functions as an acquisition section configured to acquire the position of the material passage part 54 (specifically, the sprue part 58) in the sensor coordinate system.

Then, in the image data of the molded article 50, the controller 18 traces the characteristic points (i.e., an outline) of the first runner part 56 extending from the detected sprue part 58, in a direction from the sprue part 58 toward the corresponding product part 52.

At step S12, the controller 18 determines whether or not the material passage part is detected. Specifically, the controller 18 determines whether or not the first runner part 56 extends from the sprue part 58 to the first gate part 60 formed at the distal end of the first runner part 56 (i.e., whether or not the first runner part 56 is not cut halfway), as a result of tracing the outline of the first runner part 56 at step S11.

If the controller 18 determines that the first runner part 56 extends from the sprue part 58 to the first gate part 60 (i.e., determines YES), the controller 18 proceeds to step S13. On the other hand, if the controller 18 determines that the first runner part 56 does not extend from the sprue part 58 to the first gate part 60 (i.e., determines NO), the controller 18 proceeds to step S15.

At step S13, the controller 18 determines a first target position. Specifically, the controller 18 specifies a predetermined position in the first runner part 56 as a first cut spot. As an example, this predetermined position is set at a substantially central position in an extension direction of the runner part 56, as indicated by point B in FIG. 2.

The controller 18 determines the position of the specified first cut spot B in the sensor coordinate system as the first target position. Thus, in this embodiment, the controller 18 functions as a determination section configured to determine the position of the cut spot B as the target position.

The controller 18 converts the determined position of the first cut spot B in the sensor coordinate system (i.e., the first target position) into a position in the robot coordinate system, and stores it in the storage.

At step S14, the controller 18 cuts the first cut spot B. Specifically, the controller 18 sends a command to each servo motor built in the rotary barrel 26, the robot arm 28, and the wrist 30 based on the first target position in the robot coordinate system, which has been stored at step S13, so as to arrange the cutting device 32 at a first work position.

When the cutting device 32 is arranged at the first work position, the first cut spot B is positioned between the blades 36 and 38 in the open state. Thus, in this embodiment, the controller 18 functions as a manipulator controller configured to operate the manipulator (the rotary barrel 26, the robot arm 28, and the wrist 30).

Then, the controller 18 sends a command to the blade drive section 40 so as to move the blades 36 and 38 in the open state in a closing direction to approach each other. As a result, the first runner part 56 is nipped to be cut by the blades 36 and 38 at the cut spot B. Thus, in this embodiment, the controller 18 functions as a cut controller configured to operate the cutting device 32. Then, the controller 18 returns to step S2 in FIG. 3.

On the other hand, if the controller 18 determines NO at step S12, at step S15, the controller 18 carries out a second material passage part detection scheme.

Specifically, similarly as the above-mentioned step S11, the controller 18 detects a position of the sprue part 58 in the sensor coordinate system, in the image data of the molded article 50 which has been acquired from the vision sensor 16 at most-recent step S2.

Then, the controller 18 traces an outline of the second runner part 56 different from the first runner part 56, in a direction from the sprue part 58 toward the corresponding product part 52. For example, the second runner part 56 is adjacent to the first runner part 56 in a clockwise direction (or a counterclockwise direction) when viewed from the upper side.

At step S16, the controller 18 determines whether or not a material passage part is detected. Specifically, the controller 18 determines whether or not the second runner part 56 extends from the sprue part 58 to the second gate part 60 formed at a distal end of the second runner part 56, as a result of tracing the outline of the second runner part 56 at step S15.

If the controller 18 determines that the second runner part 56 extends from the sprue part 58 to the second gate part 60 (i.e., determines YES), the controller 18 proceeds to step S17. On the other hand, if the controller 18 determines that the second runner part 56 does not extend from the sprue part 58 to the second gate part 60 (i.e., determines NO), the controller 18 proceeds to step S19.

At step S17, the controller 18 determines a second target position. Specifically, the controller 18 specifies a predetermined position (e.g., a substantially central position in the extension direction) in the second runner part 56 as a second cut spot B.

The controller 18 determines the position of the specified second cut spot B in the sensor coordinate system as the second target position. The controller 18 converts the determined second target position in the sensor coordinate system into a position in the robot coordinate system, and stores it in the storage.

At step S18, the controller 18 cuts the second cut spot B. Specifically, the controller 18 operates the rotary barrel 26, the robot arm 28, and the wrist 30 based on the second target position in the robot coordinate system, which has been stored at step S17, so as to arrange the cutting device 32 at a second work position. When the cutting device 32 is arranged at the second work position, the second cut spot B is positioned between the blades 36 and 38 in the open state.

Then, the controller 18 sends a command to the blade drive section 40 so as to move the blades 36 and 38 in the open state in the closing direction to cut the second cut spot B. Then, the controller 18 returns to step S2 in FIG. 3.

On the other hand, if the controller 18 determines NO at step S16, at step S19, the controller 18 carries out a third material passage part detection scheme. Specifically, the controller 18 detects a position of the sprue part 58 in the sensor coordinate system in the image data of the molded article 50 acquired from the vision sensor 16 at most-recent step S2.

Then, the controller 18 traces an outline of the third runner part 56 different from the first and second runner parts 56 in a direction from the sprue part 58 toward the corresponding product part 52. For example, the third runner part 56 is adjacent to the second runner part 56 in the clockwise direction (or the counterclockwise direction) when viewed from the upper side.

At step S20, the controller 18 determines whether or not a material passage part is detected. Specifically, the controller 18 determines whether or not the third runner part 56 extends from the sprue part 58 to the third gate part 60 formed at the distal end of the third runner part 56, as a result of tracing the outline of the third runner part 56 at step S19.

If the controller 18 determines that the third runner part 56 extends from the sprue part 58 to the third gate part 60 (i.e., determines YES), the controller 18 proceeds to step S21. On the other hand, if the controller 18 determines that the third runner part 56 does not extend from the sprue part 58 to the third gate part 60 (i.e., determines NO), the controller 18 proceeds to step S23.

At step S21, the controller 18 determines a third target position. Specifically, the controller 18 specifies a predetermined position (e.g., a substantially central position in the extension direction) in the third runner part 56 as a third cut spot B.

The controller 18 determines the position of the specified third cut spot B in the sensor coordinate system as the third target position. The controller 18 converts the determined third target position in the sensor coordinate system into a position in the robot coordinate system, and stores it in the storage.

At step S22, the controller 18 cuts the third cut spot B. Specifically, the controller 18 operates the rotary barrel 26, the robot arm 28, and the wrist 30 based on the third target position in the robot coordinate system, which has been stored at step S21, so as to arrange the cutting device 32 at a third work position. When the cutting device 32 is arranged at the third work position, the third cut spot B is positioned between the blades 36 and 38 in the open state.

Then, the controller 18 sends a command to the blade drive section 40 so as to move the blades 36 and 38 in the open state in the closing direction to cut the third cut spot B. Then, the controller 18 returns to step S2 in FIG. 3.

On the other hand, if the controller 18 determines NO at step S20, at step S23, the controller 18 carries out a fourth material passage part detection scheme. Specifically, the controller 18 detects a position of the sprue part 58 in the sensor coordinate system in the image data of the molded article 50 which has been acquired at most-recent step S2.

Then, the controller 18 traces an outline of the fourth runner part 56 different from the first, second, and third runner parts 56, in a direction from the sprue part 58 toward the corresponding product part 52. For example, the fourth runner part 56 is adjacent to the third runner part 56 in the clockwise direction (or the counterclockwise direction) when viewed from the upper side.

At step S24, the controller 18 determines whether or not a material passage part is detected. Specifically, the controller 18 determines whether or not the fourth runner part 56 extends from the sprue part 58 to the fourth gate part 60 formed at a distal end of the fourth runner part 56, as result of tracing the outline of the fourth runner part 56 at step S23.

If the controller 18 determines that the fourth runner part 56 extends from the sprue part 58 to the fourth gate part 60 (i.e., determines YES), the controller 18 proceeds to step S25. On the other hand, if the controller 18 determines that the fourth runner part 56 does not extend from the sprue part 58 to the fourth gate part 60 (i.e., determines NO), the controller 18 proceeds to step S4 in FIG. 3.

At step S25, the controller 18 determines a fourth target position. Specifically, the controller 18 specifies a predetermined position (e.g., a substantially central position in the extending direction) in the fourth runner part 56 as a fourth cut spot B.

The controller 18 determines the position of the specified fourth cut spot B in the sensor coordinate system as the fourth target position. The controller 18 converts the determined fourth target position in the sensor coordinate system into a position in the robot coordinate system, and stores it in the storage.

At step S26, the controller 18 cuts the fourth cut spot B. Specifically, the controller 18 operates the rotary barrel 26, the robot arm 28, and the wrist 30 based on the fourth target position in the robot coordinate system, which has been stored at step S25, so as to arrange the cutting device 32 at a fourth work position. When the cutting device 32 is arranged at the fourth work position, the fourth cut spot B is positioned between the blades 36 and 38 in the open state.

Then, the controller 18 sends a command to the blade drive section 40 so as to move the blades 36 and 38 in the open state in the closing direction to cut the fourth cut spot B. Then, the controller 18 proceeds to step S4 in FIG. 3. By carrying out the loop of steps S2 and S3 in this way, the material passage part 54 is cut, thereby a molded article 50' illustrated in FIG. 2 is formed.

Referring again to FIG. 3, at step S4, the controller 18 sends a command to the drive section 22 of the conveyor 12 so as to convey the molded article 50' frontward.

At step S5, the controller 18 determines whether or not a next molded article 50 is placed on the upstream end of the movable section 20. For example, the controller 18 determines whether or not it has received a second placement detection signal from the placement sensor.

If the controller 18 determines that the next molded article 50 is placed on the upstream end of the movable section 20 (i.e., determines YES), the controller 18 returns to step S1. On the other hand, if the controller 18 determines that the next molded article 50 is not placed on the upstream end of the movable section 20 (i.e., determines NO), the controller 18 ends the flow illustrated in FIG. 3.

As stated above, in this embodiment, the controller 18 determines the cut spot B as the target position based on the shape of the molded article 50 detected by the vision sensor 16, and arranges the cutting device 32 at the work position for cutting the cut spot B by the operation of the robot 14.

According to this configuration, it is possible to cut the cut spot B without a jig for clamping the molded article 50. Accordingly, space saving of a manufacturing line can be realized, and latitude in a layout of the manufacturing line can be improved as well. Consequently, it is possible to set up a manufacturing line of high versatility at low cost. Further, since an operation of setting the molded article 50 in a jig can be omitted, cycle time can be reduced as well.

Figure 5:
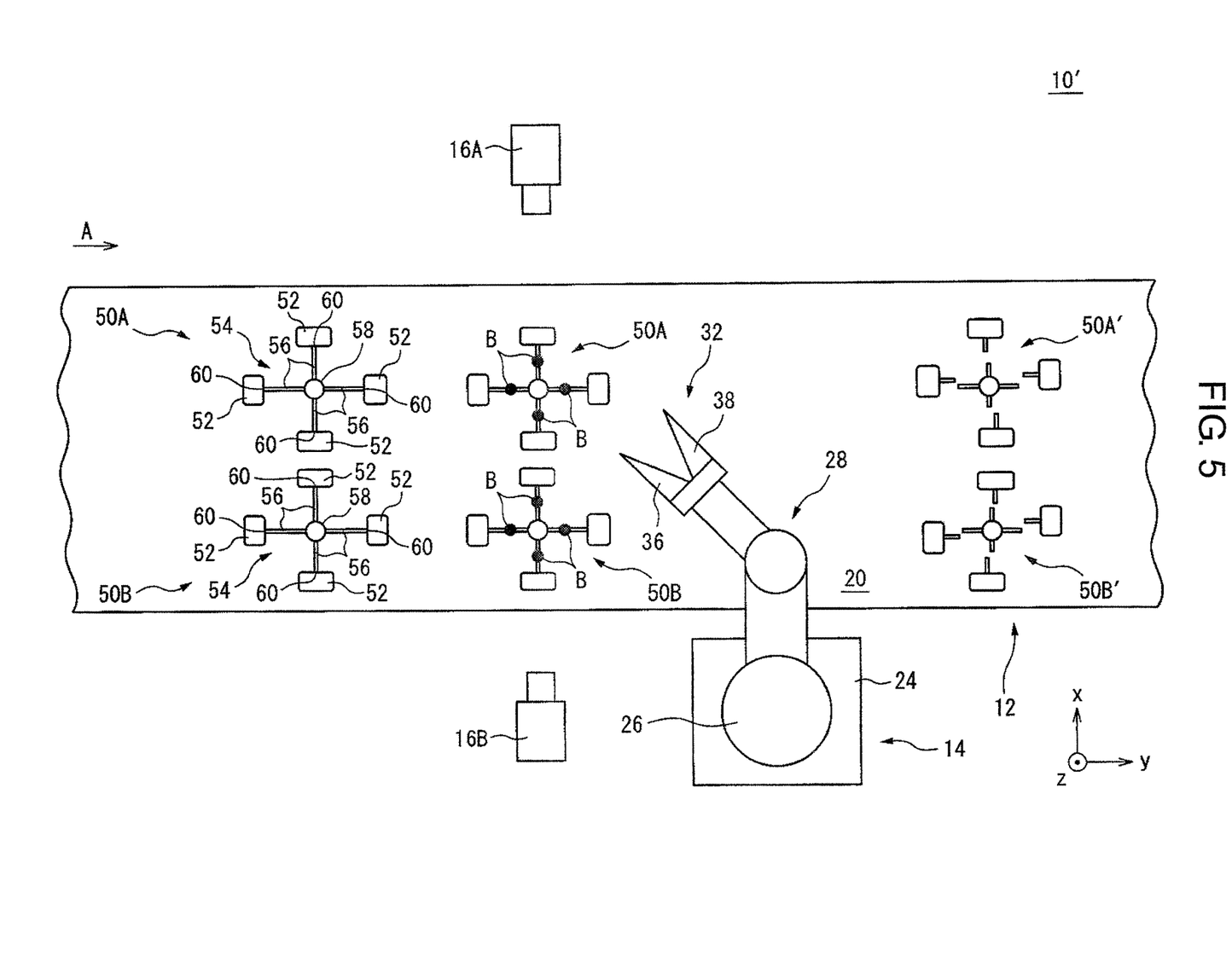
FIG. 5 is a drawing viewing a cutting system according to another embodiment from a vertical upper side.

Next, a cutting system 10' according to another embodiment will be described with reference to FIG. 5. The cutting system 10' according to this embodiment is different from the above-described cutting system 10 in that the cutting system 10' includes a first vision sensor 16A and a second vision sensor 16B. Each of the first and second vision sensors 16A and 16B has the configuration same as the above-mentioned vision sensor 16.

The cutting system 10' cuts the material passage parts 54 of molded articles 50A and 50B which are placed on the movable section 20 of the conveyor 12 so as to be adjacent to each other in the x-axis direction. Next, an operation of the cutting system 10' will be described with reference to FIG. 6.

Figure 6:
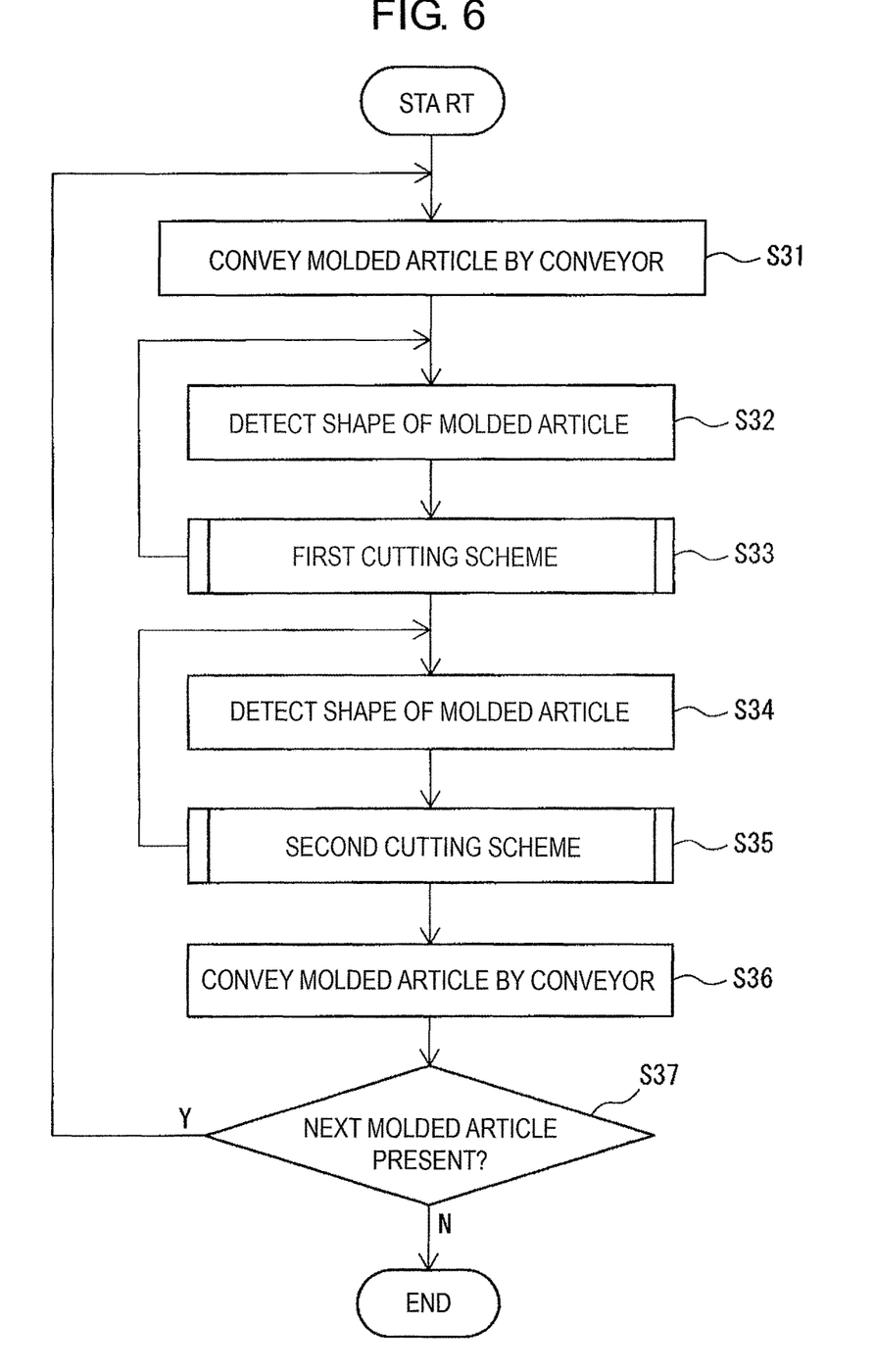
FIG. 6 is a flowchart illustrating an example of an operation flow of the cutting system illustrated in FIG. 5.

The flow illustrated in FIG. 6 is started when the controller 18 of the cutting system 10' detects that the molded articles 50A and 50B are placed on the upstream end of the movable section 20 of the conveyor 12 (e.g., when the controller 18 receives the first placement detection signal from the placement sensor). The molded articles 50A and 50B are placed on the upstream end of the movable section 20 by a user or placement robot without being fixed by a jig or the like.

At step S31, the controller 18 operates the conveyor 12 so as to convey the molded articles 50A and 50B placed on the upstream end of the movable section 20, similarly as the above-mentioned step S1.

At step S32, the controller 18 operates the vision sensor 16A so as to detect a shape of the molded article 50A, similarly as the above-mentioned step S2.

At step S33, the controller 18 carries out a first cutting scheme similar as the above-mentioned step S3. Specifically, the controller 18 carries out steps S11 to 26 illustrated in FIG. 4, based on image data of the molded article 50A acquired at most-recent step S32, so as to cut each cut spot B of the molded article 50A by the cutting device 32. Consequently, the material passage part 54 of the molded article 50A is cut, thereby a molded article 50A' illustrated in FIG. 5 is formed.

At step S34, the controller 18 operates the vision sensor 16B so as to detect a shape of the molded article 50B, similarly as the above-mentioned step S2. Here, the controller 18 may execute this step S34 concurrently with the execution of step S26 in step S33.

In this case, the next molded article 50B is imaged by the vision sensor 16B concurrently with the operation of cutting the fourth cut spot B of the molded article 50A. According to this configuration, cycle time of the operation can be efficiently reduced.

At step S35, the controller 18 carries out a second cutting scheme similar as the above-mentioned step S3. Specifically, the controller 18 carries out steps S11 to 26 illustrated in FIG. 4 based on image data of the molded article 50B acquired at most-recent step S34, so as to cut each cut spot B of the molded article 50B by the cutting device 32. Consequently, the material passage part 54 of the molded article 50B is cut, thereby a molded article 50B' illustrated in FIG. 5 is formed.

At step S36, the controller 18 sends a command to the drive section 22 of the conveyor 12 so as to convey the molded articles 50A' and 50B' frontward, similarly as the above-mentioned step S4.

At step S37, the controller 18 determines whether or not next molded articles 50A and 50B are placed on the upstream end of the movable section 20, similarly as the above-mentioned step S5.

In this embodiment, the cutting system 10' includes the first vision sensor 16A and the second vision sensor 16B, and sequentially cuts the material passage parts 54 of the molded articles 50A and 50B placed in two rows.

According to this configuration, a jig for fixing the molded articles 50A and 50B is not necessary, and it is possible to swiftly cut the material passage parts 54 of the molded articles 50A and 50B arranged in two rows. Accordingly, work efficiency can be significantly improved.

Further, according to this embodiment, the process that, during cutting one molded article 50A, the shape of the other molded article 50B is detected (or vise versa), is repeated, by which, it is possible to reduce idle time. Accordingly, work efficiency can be further efficiently enhanced.

Note that, the cutting system 10' may include a plurality of the robots 14, wherein the first robot 14 may cut the material passage part 54 of the molded article 50A while the second robot 14 may cut the material passage part 54 of the molded article 50B. In this case, the controller 18 may carries out steps S32 to S33 and steps S34 to S35 in synchronization (i.e., in parallel).

Figure 7:
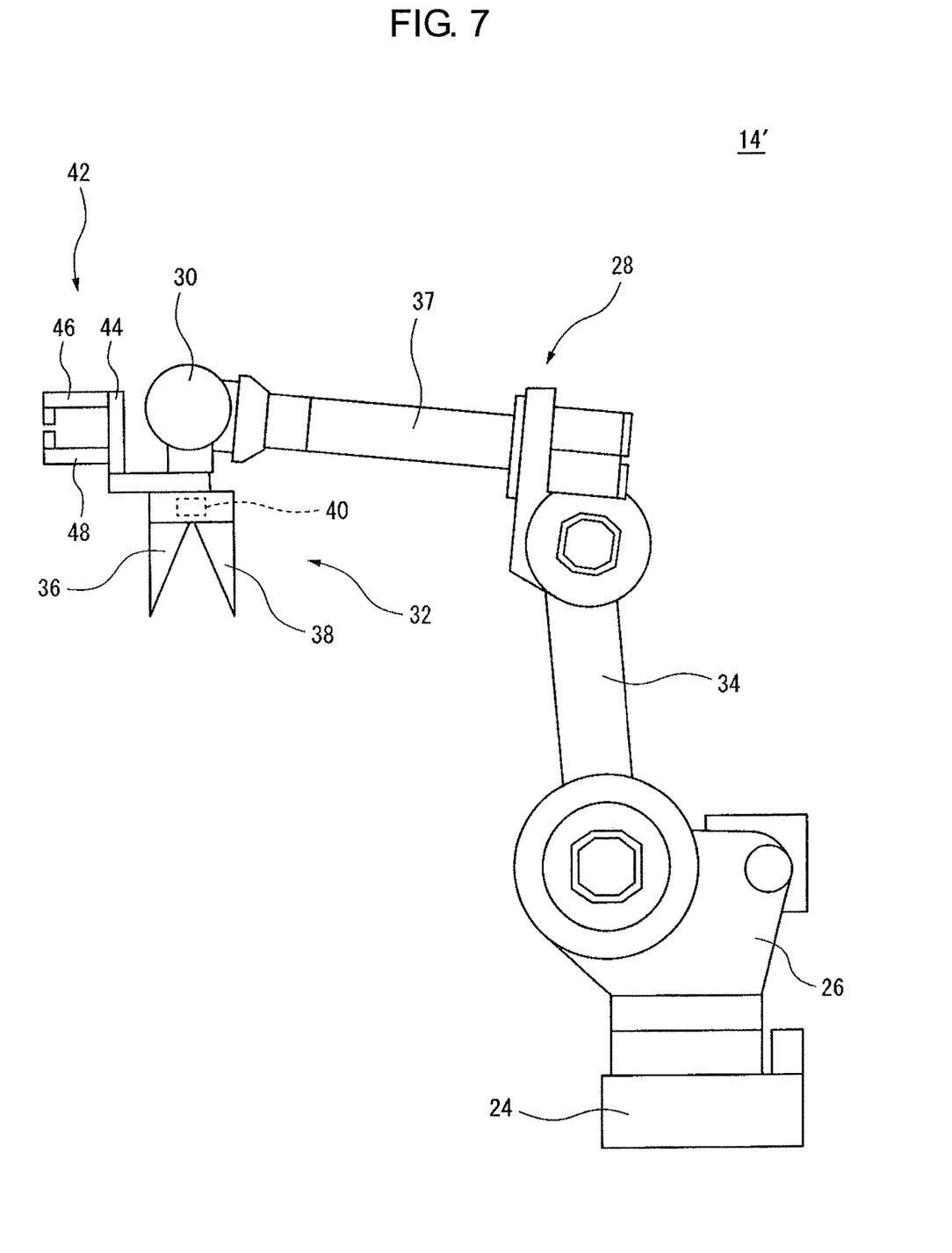
FIG. 7 is a drawing of a robot according to another embodiment.

Further, the robot 14 may further include a robot hand capable of gripping the material passage part 54 after cutting, in addition to the cutting device 32. FIG. 7 illustrates such robot 14'.

The robot 14' is different from the above-mentioned robot 14 in the following configuration. Specifically, the robot 14' further includes a robot hand 42 coupled to the wrist 30. The robot hand 42 includes a hand base 44 coupled to the wrist 30, and fingers 46 and 48 provided at the hand base 44 so as to open and close.

The controller 18 operates the robot 14' immediately before or immediately after the above-mentioned step S4 or S36, so as to grip the material passage part 54 after cutting by the robot hand 42. Then, the controller 18 operates the rotary barrel 26, the robot arm 28, and the wrist 30 so as to convey the material passage part 54 gripped by the robot hand 42 to a predetermined disposal site.

Further, the robot 14' operates the robot 14' immediately before or immediately after the above-mentioned step S4 or S36, so as to grip the product part 52 by the robot hand 42. Then, the controller 18 operates the rotary barrel 26, the robot arm 28, and the wrist 30 so as to convey the product part 52 gripped by the robot hand 42 to a predetermined storage site.

In the above-described embodiments, the controller 18 carries out steps S11 to 13, S15 to S17, S19 to 21, and S23 to 25 illustrated in FIG. 4.

However, the vision sensor 16 may carries out steps S11 to 13, S15 to S17, S19 to 21, and S23 to 25 illustrated in FIG. 4.

Specifically, at the above-mentioned step S11, the image processing processor of the vision sensor 16 (or a CPU built in the vision sensor 16) compares the image of the molded article 50, which has been acquired at most-recent step S2, with the reference image of the molded article 50 pre-stored in a storage of the vision sensor 16, and detects the position of the sprue part 58 in the sensor coordinate system in the image data of the molded article 50.

In this embodiment, the image processing processor of the vision sensor 16 functions as the acquisition section configured to acquire the position of the material passage part 54 in the sensor coordinate system.

Then, the image processing processor of the vision sensor 16 traces characteristic points (i.e., an outline) of the first runner part 56 extending from the detected sprue part 58, in a direction from the sprue part 58 toward the corresponding product part 52, in the image data of the molded article 50.

At the above-mentioned step S12, the image processing processor of the vision sensor 16 determines whether or not the first runner part 56 extends from the sprue part 58 to the first gate part 60 formed at the distal end of the first runner part 56, as a result of tracing the outline of the first runner part 56 at step S11.

At the above-mentioned step S13, the image processing processor of the vision sensor 16 specifies a predetermined position in the first runner part 56 as the first cut spot, and determines the position of the specified first cut spot B in the sensor coordinate system as the first target position.

The image processing processor of the vision sensor 16 transmits the determined first target position to the controller 18. In this embodiment, the image processing processor of the vision sensor 16 functions as a determination section configured to determine the position of the cut spot B as the target position. In a similar manner, the image processing processor of the vision sensor 16 may carry out steps S15 to S17, S19 to 21, and S23 to 25 illustrated in FIG. 4.

Note that, instead of the vision sensor 16, 16A, or 16B, a sensor capable of recognizing a shape of an object, such as a laser displacement sensor, an infrared sensor or the like, may be applied to detect the shape of the molded article 50, 50A, 50B.

Further, the robot 14 is not limited to a vertical articulated robot, but may be any type of robot. Moreover, instead of the robot 14, a loader etc. may be applied and the cutting device 32 may be moved by the loader. In this case, the loader functions as a manipulator configured to move the cutting device 32.

Further, instead of the pair of blades 36 and 38, the cutting device 32 may include a circular blade rotatably provided at the base 34, and the blade drive section 40 may drive the circular blade to rotate in accordance with a command from the controller 18.

In this case, at the above-mentioned step S14, S18, S22, and S26, the controller 18 operates the robot 14 so as to press the circular blade against the cut spot B from vertically upper side to cut the cut spot B.

Note that, if the cutting device 32 includes the circular blade, each molded article 50, 50A and 50B has a shape by which the cut spot B is not displaced when a force is applied to the cut spot B vertically downward in a state where the molded articles 50, 50A, and 50B are placed on the movable section 20.

Further, in the above-described embodiments, the controller 18 stops the conveyor 12 when the molded article 50 is arranged at the detection position at step S1 and S31. However, the controller 18 may carry out steps S2 to S3 and S32 to 35 without stopping the conveyor 12 at steps S1 and S31.

In this case, the controller 18 may reduce the speed for conveying the molded articles 50, 50A, and 50B by the conveyor 12 during the execution of steps S2 to S3 and S32 to 35.

Further, the vision sensor 16, 16A or 16B may be provided so as to be movable along the y-axis direction, wherein the cutting system 10 or 10' may further include a movement mechanism configured to move the vision sensor 16, 16A, or 16B. In this case, the controller 18 operates the movement mechanism so as to move the vision sensor 16, 16A, or 16B frontward so that the vision sensor 16, 16A, or 16B follow the molded article 50, 50A, 50B conveyed by the conveyor 12.

According to this configuration, when steps S2, S32, and S34 are carried out, it is possible to constantly position the vision sensor 16, 16A, or 16B at upward of the molded article 50, 50A, 50B conveyed by the conveyor 12.

Further, at the above-mentioned steps S13, S17, S21, and S25, the controller 18 may determine whether or not the gate part 60 formed at the distal end of the runner part 56 is connected to the corresponding product part 52, as a result of tracing the outline of the runner part 56.

In this case, at the above-mentioned steps S12, S16, S20, and S24, the controller 18 may specify the gate part 60 as a cut spot, and determine the position of the specified cut spot in the sensor coordinate system as a target position.

Then, at steps S14, S18, S22, and S26, the controller 18 cuts the gate part 60 as the cut spot. According to this configuration, the material passage part 54 remaining in the product part 52 after cutting can be reduced in size.

The invention has been described thus far through the embodiments of the invention, but the above-described embodiments do not limit the invention according to claims. Further, an embodiment obtained by combining characteristics described in the embodiments of the invention can also be included in the technical scope of the invention. However, all of combinations of these characteristics are not always required for solution to problems. Further, it is obvious for those skilled in the art that various alterations or modifications can be made in the above-described embodiments.

Further, it should be noted that an execution order of processing in operations, procedures, steps, processes, stages, and the like in devices, systems, programs, and methods illustrated in the claims, the specification, and the drawings is not especially clearly specified such as "before" and "in advance" but the processing can be realized in an arbitrary order unless an output of the previous processing is used in the following processing. Even if operation flows in the claims, the specification, and the drawings are described with "first", "next", "then", "subsequently", and the like for the sake of convenience, it does not mean that the operation flows need to be executed in this order.

The invention claimed is:

1. A method of cutting a molded article including a plurality of product parts and a plurality of material passage parts, the method comprising:
   a) detecting, by a sensor, a shape of the molded article placed in an unfixed configuration at a work position;
   b) determining, by a processor, when one of the plurality of material passage parts is detected to extend beyond an intended cut portion by analyzing the detected shape of the molded article;
   c) when the one of the plurality of material passage parts is detected to extend beyond the intended cut portion:
      determining, by the processor, a position of the one of the plurality of material passage parts in a coordinate system by analyzing the detected shape of the molded article;
      determining, by the processor, a position of a cut spot in the one of the plurality of material passage parts as a target position in the coordinate system, based on the acquired position of the one of the plurality of material passage parts;
      moving, by the processor, a cutting device in the coordinate system based on the determined target position, so as to arrange the cutting device at the work position for cutting the cut spot;
      controlling, by the processor, the cutting device arranged at the work position to cut the cut spot in the one of the plurality of material passage parts;

repeat steps (b) and (c) for another one of the plurality of material passage parts; and d) when the one of the plurality of material passage parts is not detected to extend beyond the intended cut portion, repeat steps (b) and (c) for another one of the plurality of material passage parts until each of the plurality of material passage parts are cut.

2. The method of claim 1, further comprising:

further detecting a shape of the molded article by the sensor after cutting the cut spot;

further acquiring a position of the one of the plurality of material passage parts in the coordinate system, based on the shape of the molded article detected after cutting the cut spot;

determining a position of a second cut spot in the one of the plurality of material passage parts as a second target position in the coordinate system, based on the position of the one of the plurality of material passage parts acquired after cutting the cut spot;

moving the cutting device in the coordinate system based on the determined second target position, so as to arrange the cutting device at a second work position for cutting the second cut spot; and cutting the second cut spot by the cutting device arranged at the second work position.

3. The method of claim 1, wherein a shape of a placed first molded article is detected by a first sensor, and a shape of a placed second molded article is detected by a second sensor.

4. The method of claim 1, wherein the cutting device is attached to a manipulator by which the cutting device is moved in the coordinate system.

5. The method of claim 4, further comprising:

gripping the one of the plurality of material passage parts by a robot hand attached to the manipulator, after cutting the cut spot; and operating the manipulator so as to convey the one of the plurality of material passage parts gripped by the robot hand to a predetermined site.

6. The method of claim 4, further comprising:

gripping the one of the plurality of product parts by the robot hand attached to the manipulator, after cutting the cut spot; and operating the manipulator so as to convey the one of the plurality of product parts gripped by the robot hand to a predetermined site.

7. A cutting system for cutting a molded article including a plurality of product parts and a plurality of material passage parts, the cutting system comprising:

a cutting device movable in an automatic control coordinate system;

a manipulator configured to move the cutting device in the coordinate system;

a sensor configured to:

a) detect a shape of the molded article placed in an unfixed configuration at a work position; and a processor configured to:

b) determine when one of the plurality of material passage parts is detected to extend beyond an intended cut portion by analyzing the detected shape of the molded article, and c) when the one of the plurality of material passage parts is detected to extend beyond the intended cut portion:

determine a position of the one of the plurality of material passage parts in the coordinate system by analyzing the shape of the molded article detected by the sensor, determine a position of a cut spot in the one of the plurality of material passage parts as a target position in the coordinate system, based on the position of the one of the plurality of material passage parts, operate the manipulator based on the target position, so as to move the cutting device in the coordinate system to arrange the cutting device at the work position for the cutting the cut spot, operate the cutting device arranged at the work position to cut the cut spot in the one of the plurality of material passage parts, repeat steps (b) and (c) for another one of the plurality of material passage parts, and d) when the one of the plurality of material passage parts is not detected to extend beyond the intended cut portion, repeat steps (b) and (c) for another one of the plurality of material passage parts until each of the plurality of material passage parts are cut.

* * * * *